United States Patent
Cheung et al.

(10) Patent No.: US 9,420,918 B2
(45) Date of Patent: Aug. 23, 2016

(54) MULTIFUNCTION FOOD PROCESSOR

(71) Applicant: Huiyang Allan Plastic & Electric Industries Co., Limited, Huizhou (CN)

(72) Inventors: Shu Sang Cheung, Hong Kong (HK); To Yin Pang, Hong Kong (HK)

(*) Notice: Subject to any disclaimer, the term of this patent is extended or adjusted under 35 U.S.C. 154(b) by 8 days.

(21) Appl. No.: 14/607,129

(22) Filed: Jan. 28, 2015

(65) Prior Publication Data

US 2016/0157677 A1    Jun. 9, 2016

(30) Foreign Application Priority Data

Dec. 5, 2014   (CN) .......................... 2014 2 0755672

(51) Int. Cl.
*A47J 43/08*     (2006.01)
*A47J 43/044*    (2006.01)

(52) U.S. Cl.
CPC .............. *A47J 43/082* (2013.01); *A47J 43/044* (2013.01); *A47J 43/085* (2013.01); *A47J 2043/04481* (2013.01)

(58) Field of Classification Search
None
See application file for complete search history.

(56) References Cited

U.S. PATENT DOCUMENTS

| | | | | |
|---|---|---|---|---|
| 5,911,505 A | * | 6/1999 | St. John | A21C 1/02 366/200 |
| 2007/0030758 A1 | * | 2/2007 | Lim | A47J 43/082 366/200 |
| 2013/0068055 A1 | * | 3/2013 | Blagotinsek | A47J 43/044 74/96 |

FOREIGN PATENT DOCUMENTS

DE      102006028604 A1 * 12/2007 ............. A47B 77/08

* cited by examiner

*Primary Examiner* — Walter L Lindsay, Jr.
*Assistant Examiner* — Jas Sanghera
(74) *Attorney, Agent, or Firm* — Prakash Nama; Global IP Services, PLLC

(57) ABSTRACT

The invention discloses a multifunction food processor with a body which provides power, a base, a connector for connecting stirring tool set on the body, a container which is coaxial with the connector, a body support is arranged between the body and the base, one side of the body support connects with the body vertically, the body can rotate surrounding the body support multi-angle vertically, the other side with the base vertically. The body support includes a first connection component, a second connection component, a connector, an elastic element, a guide pillar and a button. The multifunction food processor's body can rotate multi-angle with different stirring tool for different use such as blender, chopper and juicer. It is easy and safe for using.

7 Claims, 4 Drawing Sheets

MULTIFUNCTION FOOD PROCESSOR

BACKGROUND OF THE INVENTION

1. Field of the Invention

The present invention relates to household kitchen appliances, in particular to a multifunction food processor which can engage with different food processing tools, such as an egg beater, a potatoes blender, a chopper, a blender, etc., for processing different food.

2. Description of Related Art

Generally there are two kinds of stand mixers in the market, the first one is a food processor with two connectors, a motor may be set vertically or horizontally, the first connector at one side of the motor connects with a juicer, the second connector at the other side connects with mixing tool. The second one is a food processor with three connectors, a motor is set horizontally, the output shaft connects with the stirring tool, the front output shaft connects with chopper, the rear output shaft is arranged with juicer. Two kind of the above food processor can blend, juice, and chop, but with two or three connectors, it is complex, inconvenient and high cost.

BRIEF DESCRIPTION OF THE SEVERAL VIEWS OF THE DRAWING(S)

The foregoing and other exemplary purposes, aspects and advantages of the present invention will be better understood in principle form the following detailed description of one or more exemplary embodiments of the invention with reference to the drawings, in which.

DETAILED DESCRIPTION OF THE INVENTION

The invention will now be described in detail through several embodiments with reference to the accompanying drawings.

Figure 1:
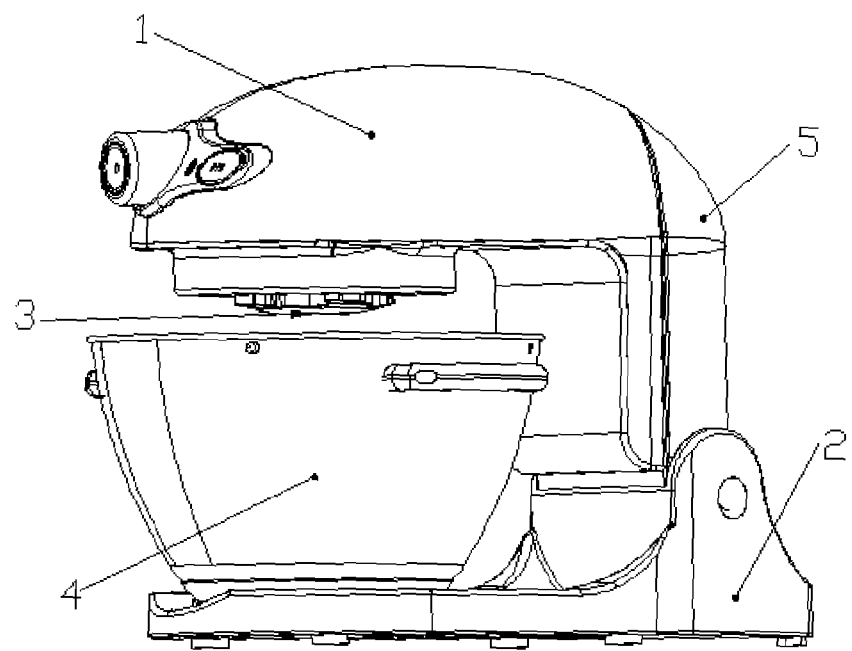
FIG. 1 is a perspective view of a multifunction food processor according to the present invention.
Figure 2:
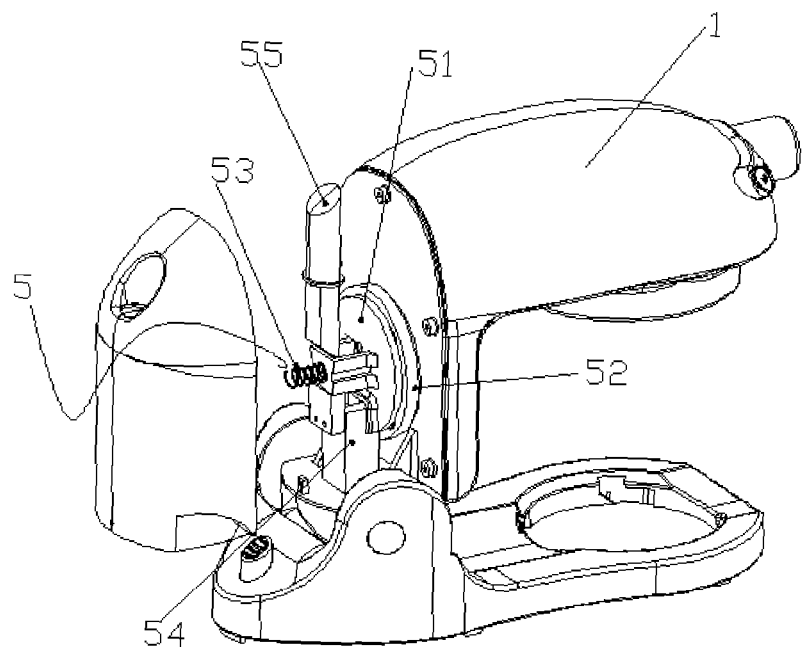
FIG. 2 is a partial exploded view of the multifunction food processor of the present invention when being viewed from another side.
Figure 3:
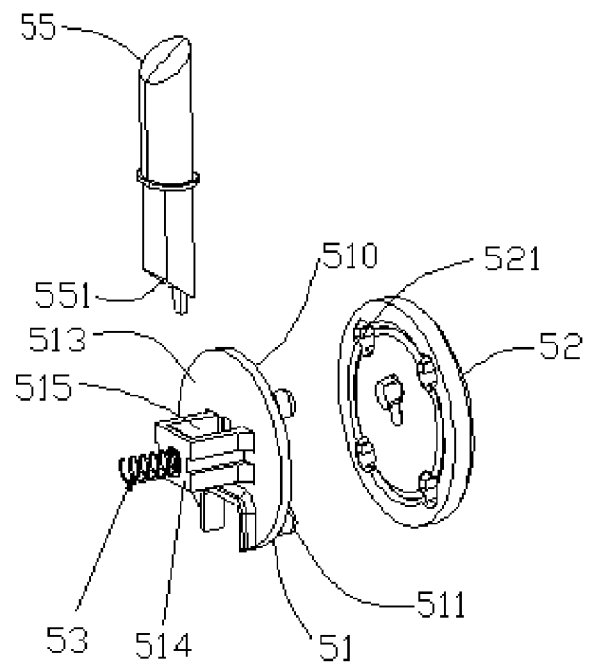
FIG. 3 is an explosive view of a part of a body support of the multifunction food processor of the present invention.
Figure 4:
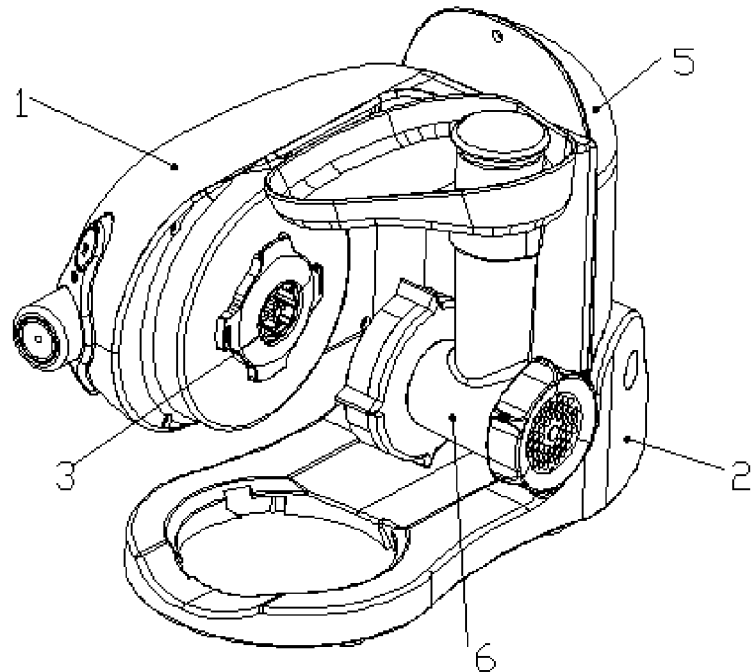
FIG. 4 is a perspective view of the multifunction food processor of FIG. 1, the body is rotated by 90 degrees.
Figure 5:
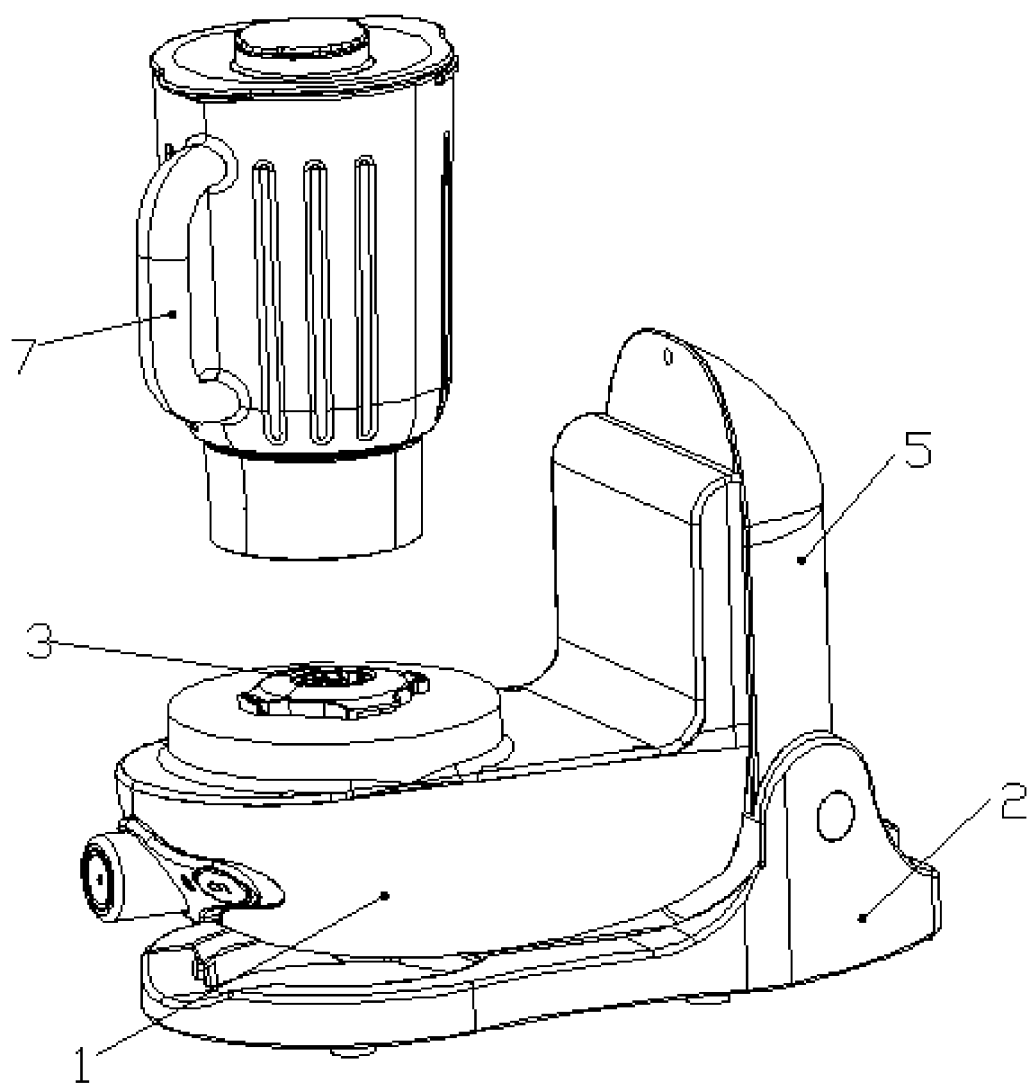
FIG. 5 is a perspective view of the multifunction food processor of FIG. 1, the body is rotated by 180 degrees.
Figure 6:
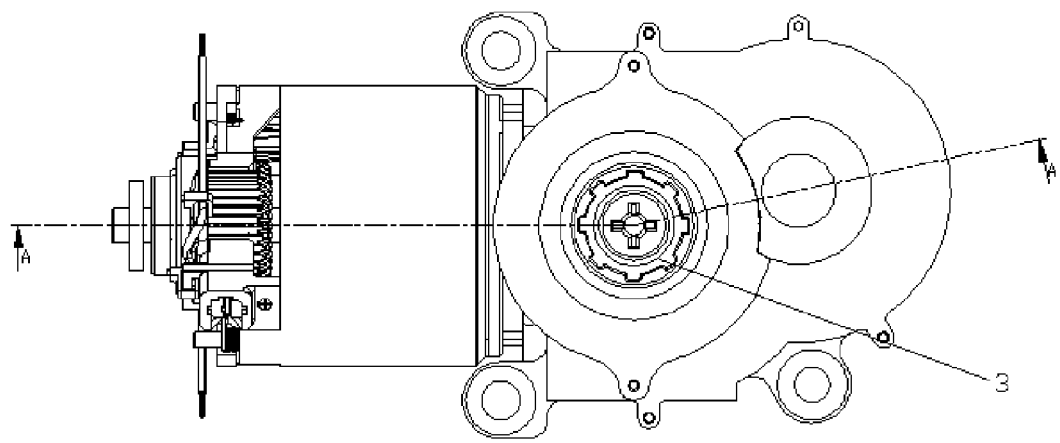
FIG. 6 is an upward view of a part of the body of FIG. 1.
Figure 7:
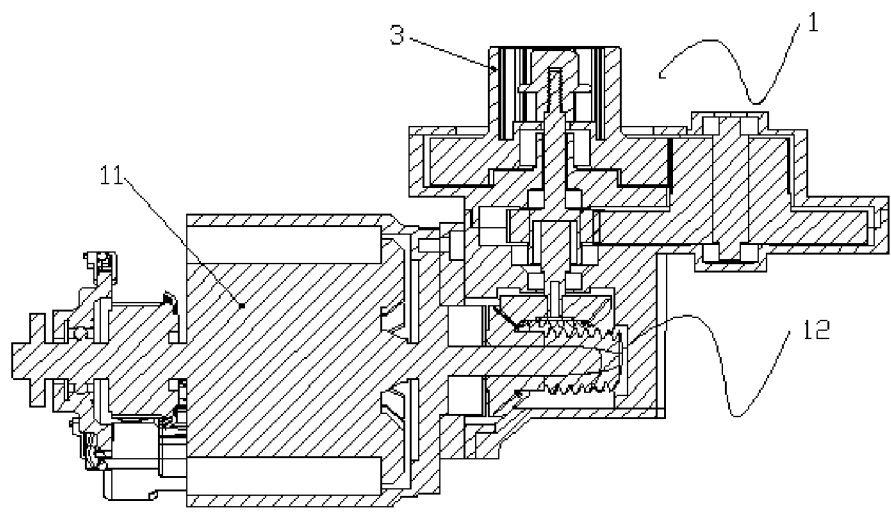
FIG. 7 is a cross-section view of the body being cut along line A-A of FIG. 6.

As shown in FIGS. 1, 4, and 5, a multifunction food processor according to an embodiment of the present invention mainly includes a body 1, a base 2 and a body support 5 connected between the body 1 and the base 2.

The base 2 is such designed that it can be positioned on a plane supporting surface (not shown), such as a plane upper surface of the desk. The base 2 may define a recess for receiving a bottom of a processed-food container.

The body support 5 extends upwardly from an end of the base 2 and defining a fixing surface which is preferably perpendicular to the plane supporting surface.

The body 1 is attached to the fixing surface of the body support 5, and is capable of rotating around a first axis substantially perpendicular to the fixing surface. In the embodiment, the fixing surface is perpendicular to the plane supporting surface, thus the first axis is substantially parallel to the plane supporting surface, however, it is not limited to this, the fixing surface can be tilted relative to the plane supporting surface, and the first axis is tilted relative to the plane supporting surface, too.

The body 1 includes a connector 3 configured for connecting with different food processing tools, a motor 11 with an output shaft, and a gear assembly 12 connected between the output shaft of the motor 11 and the connector 3. The gear assembly 12 is used for transmitting power from the motor 11 to the connector 3 to drive the connector 3 to rotate around a rotation axis of the connector. The motor 11 is preferably positioned horizontally, and the rotation axis of the connector 3 is preferred to be perpendicular to the first axis. It is understandably, the multifunction food processor can realize its multifunction as long as the rotation axis of the connector 3 is not parallel to the first axis.

Please referring to FIGS. 2, 3, 6 and 7, a first connection component 52 is fixed on the body 1 at a connection position between the body support 5 and the body 1.

The body support 5 includes a guide pillar 54 extending upwardly from a bottom of the body support 5, a second connection component 51 positioned in the fixing surface, a button 55 protruding out of an upper surface of the body support 5, and an elastic element 53.

The upper surface of the guide pillar 54 has a guide track substantially parallel to the first axis. The second connection component 51 is connected with the guide track of the guide pillar 54, and can move between a first position and a second position along the guide track of the guide pillar 54. The fixing surface defines a hole permitting the second connection component 51 to pass and protrude out the fixing surface. A first end 510, facing the first connection component 52 and exposed out from the hole in the fixing surface, of the second connection component 51 is such designed that it can be pivotally attached to the first connection component 52 and rigidly fastened to the first connection component 52 in a plurality of relative orientations when the second connection component 51 is moved to the first position. The second connection component 51 is rotatable relative to the first connection component 52 when the second connection component 51 is moved to the second position.

In the embodiment, four posts 511 protrude from the first end 510 of the second connection component 51 towards the first connection component 52, and four recesses 521 are defined in the first connection component 52 and are configured for receiving the four posts 511 respectively when the second connection component 51 is at the first position, such that the first and second connection components 51, 52 can engage with each other in three or four relative orientations. It is understandably, the number of the posts 511 and the recesses 521 is not limited to four, it also could be three or more than four.

A second end 513 of the second connection component 51 includes a frame 514 with a hole 515 towards the button 55. The button 55 has a bevel edge 551 at its bottom end. The surface of the bevel edge 551 is opposite to the first end 510, and a vertical line of a center of the bevel edge 551 passes an edge of the hole 515 of the frame 514. Thus, when the button 55 is pressed down, the bevel edge 551 inserts in the hole 515 and pushes the edge of the hole 515 towards a direction away the first connection component 52. As a result, the second connection component 51 is moved by the pressed button 55 to the second position, and the posts 511 are removed from the recesses 521.

The elastic element 53 is connected to the outside surface of the frame 514 of the second connection component 51 and is used for maintaining the second connection component 51 at the first position when the button 55 is not pressed. An elastic force of the elastic element 53 is parallel to the first axis. In the embodiment, the elastic element 53 is a spring with one end pressing the inner wall of the case of the body support and the other end pressing and connecting the frame 514.

In operation, when press the button 55, the post 511 of the second connection component 51 separates from the recess 521 of the first connection component 52 under the thrust of the button 55 with the help of guide pillar 54. At this time we can rotate the body 1 at the angle we want. When the position of the post 511 is match with the recess 521, the button 55 is released, the second connection component 51 connects with the first connection component 52 with the help of the thrust of the spring.

In the embodiment, the body 1 is L shaped, and includes a first part and a second part substantially perpendicular to the first part. The motor 11, the gear assembly 12 and connecter 3 are located on the first part, and the first connection component 52 is fixed on the second part.

When the body connects with the body support as a overturn L (the first part of the body 1 is positioned at the highest position, the rotation axis of the connector 3 is vertical, and the connector 3 faces down), the connector can connect with the mixing assembly as a blender. When the body rotate 90° around the body support vertically (the first part of the body 1 is positioned at a middle position, and the rotation axis of the connector 3 is horizontal), the connector can connect with minced meat component as a chopper. When the body rotate 180° around the body support as a L vertically (the first part of the body 1 is positioned at the lowest position, the rotation axis of the connector 3 is vertical and the connector 3 faces up), the connector can connect with juice components as a juicer.

The body of the multifunction food processor of the present invention can rotate relative to the body support and can be fixed at several positions. The body has only one connector for connecting with different processing tools. When the body connects with the body support as a overturn L, the connector can connect with a mixing tool as a blender; when the body rotate 90° around the body support, and the rotating axis of the connector is substantially horizontal, the connector can connect with a minced meat component as a chopper; when the body rotate 180° around the body support, so that the connector faces up, the connector can connect with a juice component as a juicer. It is really multifunctional, simple structure, safe, convenient and low cost. To sum up, the body of the multifunction food processor can rotate multi-angle with just a connector for different stirring tool. It is really multifunction, simple structure, safe, convenient and low cost.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A multifunction food processor, comprising:
a base capable of being positioned on a plane supporting surface;
a body support extending upwardly from an end of the base and defining a fixing surface; and
a body rotatably connected with the body support and capable of rotating around a first axis substantially perpendicular to the fixing surface, the body comprising:
a connector configured for connecting with a food processing tool, a rotation axis of the connector being not parallel to the first axis; and
a motor configured for driving the connector to rotate around the rotation axis of the connector;
a first connection component is fixed on the body at a connection position between the body support and the body; the body support comprises:
a guide pillar;
a second connection component connected with the guide pillar and the first connection component and being capable of moving between a first position and a second position along the first axis;
a button configured for pushing the second connection component to the second position when being pressed; and
an elastic element connected to the second connection component and configured for maintaining the second connection component at the first position when the button is not pressed, an elastic force of the elastic element being parallel to the first axis;
wherein the second connection component is pivotally attached to the first connection component and rigidly fastened to the first connection component in a plurality of relative orientations when the second connection component is moved to the first position; the second connection component is rotatable relative to the first connection component when the second connection component is moved to the second position.

2. The multifunction food processor of claim 1, wherein the body further comprises a gear assembly connected between an output shaft of the motor and the connector; the gear assembly is configured for transmitting power.

3. The multifunction food processor of claim 1, wherein the body comprises a first part and a second part substantially perpendicular to the first part; the connector is located on the first part; the first connection component is fixed on the second part.

4. The multifunction food processor of claim 1, wherein a plurality of posts protrude from the second connection component towards the first connection component, and a plurality of recesses are defined in the first connection component and are configured for receiving the plurality of pose respectively when the second connection component is at the first position, such that the first and second connection components can engage with each other in a plurality of relative orientations.

5. The unction food processor of claim 4, wherein there are four posts protruding from the second connection component and uniformly disposed in a circle, and four recesses are defined in the first connection component and corresponding to the four posts.

6. The multifunction food processor of claim 1, wherein the elastic element is a spring.

7. The multifunction food processor of claim 1, wherein when the connector faces to the plane supporting surface, the food processing tool is a mixing tool for mixing food; when the rotation axis of the connector is substantially parallel to the plane supporting surface, the food processing tool is a chopper for cutting up food; when the connector faces up, the food processing tool is a juice component for obtaining juice from food.

* * * * *